(12) United States Patent
Safrani et al.

(10) Patent No.: US 9,880,377 B1
(45) Date of Patent: Jan. 30, 2018

(54) MULTIPLE WAVELENGTHS REAL TIME PHASE SHIFT INTERFERENCE MICROSCOPY

(71) Applicant: Photonicsys Ltd., Wahat Alsalam (IL)

(72) Inventors: Avner Safrani, D.N. Misgav (IL); Michael Ney, Be'er Sheva (IL); Ibrahim Abdulhalim, Wahat-Alsalam-Neve Shalom (IL)

(73) Assignee: Photonicsys Ltd., Wahat Alsalam (IL)

( * ) Notice: Subject to any disclaimer, the term of this patent is extended or adjusted under 35 U.S.C. 154(b) by 0 days.

(21) Appl. No.: 15/260,398

(22) Filed: Sep. 9, 2016

(51) Int. Cl.
| | |
|---|---|
| *G07B 9/02* | (2006.01) |
| *G02B 21/00* | (2006.01) |
| *G02B 27/28* | (2006.01) |
| *G02B 21/36* | (2006.01) |
| *G02B 21/22* | (2006.01) |
| *G02B 21/26* | (2006.01) |

(52) U.S. Cl.
CPC ..... *G02B 21/0056* (2013.01); *G02B 21/0032* (2013.01); *G02B 21/0064* (2013.01); *G02B 21/0084* (2013.01); *G02B 21/0092* (2013.01); *G02B 21/22* (2013.01); *G02B 21/26* (2013.01); *G02B 21/365* (2013.01); *G02B 27/286* (2013.01)

(58) Field of Classification Search
CPC ............ G01B 9/02007; G01B 9/02087; G01B 2290/45; G01B 2290/70
See application file for complete search history.

(56) References Cited

U.S. PATENT DOCUMENTS

| | | | |
|---|---|---|---|
| 8,072,610 B1 | 12/2011 | Schmit et al. | |
| 8,269,980 B1 * | 9/2012 | Szwaykowski | G01B 11/2441 356/504 |
| 9,310,186 B2 * | 4/2016 | Abdulhalim | G01B 9/02004 |
| 2001/0035961 A1 * | 11/2001 | Mitsutani | G01B 11/2441 356/512 |
| 2005/0099682 A1 * | 5/2005 | Lauer | G02B 21/0004 359/386 |
| 2008/0002212 A1 * | 1/2008 | Kawasaki | G01B 9/02019 356/512 |
| 2008/0285048 A1 * | 11/2008 | Chen | G01B 11/2441 356/492 |
| 2010/0309476 A1 | 12/2010 | Millerd | |
| 2015/0118877 A1 | 4/2015 | He | |

OTHER PUBLICATIONS

Cheng et al.; "Multiple-wavelength phase-shifting interferometry"; Applied Optics, vol. 24, No. 6, Mar. 15, 1985, pp. 804-807.
Cheng et al.; "Two-wavelength phase-shifting interferometry"; Applied Optics, vol. 23, No. 24, Dec. 15, 1984, pp. 4539-4543.

(Continued)

*Primary Examiner* — Jonathan Hansen
(74) *Attorney, Agent, or Firm* — Ohlandt, Greeley, Ruggiero & Perle L.L.P.

(57) ABSTRACT

A system microscopy system and method that enable obtaining high resolution 3D images in a single shot are presented. The system is an ultra-high speed, real time multi wavelength phase shift interference microscopy system that uses three synchronized color CCD cameras. Each CCD is equipped with a precision achromatic phase mask which in turn allows obtaining π/2 phase shifted signals in three different wavelengths simultaneously.

13 Claims, 5 Drawing Sheets

(56) References Cited

OTHER PUBLICATIONS

Creath et al.; "Dynamic quantitative phase imaging for biological objexts using a pixelated phase mask"; Biomedical Optics Express, vol. 3, No. 11; Nov. 1, 2012; pp. 2866-2880.

Creath, Katherine; "Phase-Measurement Interferometry Techniques"; E. Wolf, Progress in Optics XXVI, 1988, pp. 351-366.

Creath, Katherine; "Step height measurement using two-wavelength phase-shifting interferometry"; Applied Optics vol. 26, No. 14, Jul. 15, 1987, pp. 2810-2816.

Cuche et al.; "One-shot analysis"; Nature Photonics, vol. 3, Nov. 2009; pp. 633-635.

Helen et al.; "Achromatic phase shifting by a rotating polarizer"; Optics Communications 154, Sep. 15, 1998, pp. 249-254.

Huntley et al.; "Temporal phase-unwrapping algorithm for automated interferogram analysis"; Applied Optics, vol. 32, No. 17, Jun. 10, 1993, pp. 3047-3052.

Koliopoulos, Chris L.; "Simultaneous phase shift interferometer"; SPIE vol. 1531, Advanced Optical Manufacturing end Testing II, 1991, pp. 119-127.

Macy, William W., Jr.; "Two-dimensional fringe-pattern analysis"; Applied Optics, vol. 22, No. 23, Dec. 1, 1983, pp. 3898-3901.

Brunning, J.H.; "Fringe Scanning Interferometers"; Optical Shop Testing, D. Malacara, Ed., 1978, pp. 409-437.

Ngoi et al.; "Instantaneous phase shifting arrangement for microsurface profiling of flat surfaces"; Optics Communications, 190, Apr. 1, 2001, pp. 109-116.

Novak et al.; "Analysis of a micropolarizer array-based simultaneous phase-shifting interferometer"; Applied Optics, vol. 44, No. 32, Nov. 10, 2005; pp. 6861-6868.

Polhemus, C., "Two-Wavelength Interferometry"; Applied Optics, vol. 12, No. 9, Sep. 1973, pp. 2071-2074.

Quiroga et al.; "Phase-unwrapping algorithm for noisy phase-map processing"; Applied Optics, vol. 33, No. 29, Oct. 10, 1994, pp. 6725-6731.

Rinehart et al.; "Simultaneous two-wavelength transmission quantitative phase microscopy with a color camera"; Optics Letters, vol. 35, No. 15, Aug. 1, 2010, pp. 2612-2614.

Safrani et al.; "High-speed 3D imaging using two-wavelength parallel-phase-shift interferometry"; Optics Letters, vol. 40, No. 20, Oct. 15, 2015, pp. 4651-4654.

Smythe et al.; "Instantaneous phase measuring interferometry"; Optical Engineering, Jul./Aug. 1984, vol. 23, No. 1, pp. 361-364.

Stetson, Karl A.; "Phase-step interferometry of irregular shapes by using an edge-following algorithm"; Applied Optics, vol. 31, No. 25, Sep. 1, 1992, pp. 5320-5325.

Takeda et al.; "Fourier-transform method of fringe-pattern analysis for computer-based topography and interferometry", J. Opt. Soc. Am., vol. 72, No. 1, Jan. 1982, pp. 156-160.

Vrooman et al.; "Image processing algorithms for the analysis of phase-shifted speckle interference patterns"; Applied Optics, vol. 30, No. 13, May 1, 1991, pp. 1636-1641.

Wyant, J.C.; "Testing Aspherics Using Two-Wavelength Holography", Applied Optics, vol. 10, No. 9, Sep. 1971, pp. 2113-2118.

Zu et al.; "Simple and effective phase unwrapping technique"; SPIE, vol. 2003, Interferometry VI, 1993, pp. 254-263.

\* cited by examiner

MULTIPLE WAVELENGTHS REAL TIME PHASE SHIFT INTERFERENCE MICROSCOPY

FIELD OF THE INVENTION

The invention is from the field of optical imaging. In particular the invention is from the field of real time high resolution three dimensional imaging.

BACKGROUND OF THE INVENTION

Publications and other reference materials referred to herein are numerically referenced in the following text and respectively grouped in the appended Bibliography which immediately precedes the claims.

Phase shift interferometry (PSI) [1] is a well-established optical technology that allows high resolution non-contact three dimensional (3D) topographical measurements of objects. In PSI the 3D topography is obtained by using the interference signal phase values from each point of the surface of the object. As the phase is packed within the interference signal, there is a need to extract the phase. The standard approach to extract the phase from the interference signal is by changing the reference arm length of the interferometer of the PSI system in four (minimum three) equal steps with step size equivalent to $\pi/2$ phase shift [5]; for each step the interference signal is recorded. Using these four phase shifted signals the phase is extracted for each point on the surface of the sample.

There are several problems with the standard phase shift approach. First, as PSI is a very sensitive technique with sensitivity in the nanometer (nm) range, the fact that the phase shifted signals are grabbed successively and not simultaneously might introduce an error if the interferometer is not super stable during the successive phase shifted measurements. Second, dynamically changing scenes cannot be imaged without producing serious errors since the phase shifting requires time. Third, industrial rapid process control procedures are seriously slowed down because for each frame of the sample field four (minimum three) snapshots must be made in order to extract the phase. On top of all these, the extracted phase is wrapped $2\pi$ modulo so that surfaces with overall height variation larger than one fringe of the interference signal, e.g., a variation of $2\pi$ in the phase of the interference signal, cannot be easily reconstructed.

Generally speaking, a change of $2\pi$ in the phase of the interference signal is equivalent to a change of $\lambda/2$ in the surface topography. Obviously, this limits the technique to samples with height variations of only several hundreds of nanometers while the majority of applications require the ability to image samples with height variations of several micrometers. In the past, many researchers concentrated on phase unwrapping algorithms [3-9] which provide partial solution for samples with overall height variations larger than one fringe; however, these algorithms are often likely to collapse if the sample is with large steps, discontinuities or too large speckle noise. An important solution for these problems, which included two wavelengths, was suggested back in the seventies in the context of holography [10]; later this approach was implemented in PSI [11-13] and also using several wavelengths [14].

In the past, several research groups published simultaneous PSI using four CCD cameras [19-21] each grabbing an image with $\pi/2$ phase shift. However, to the best of the inventors' knowledge none of the preceding works demonstrated simultaneous PSI using only three CCDs. Moreover, none of the preceding works demonstrated multi wavelengths simultaneous PSI. In addition none of the preceding works demonstrated a three wavelengths calibration procedure to correct for the non-idealities of the optical phase components used.

It is a purpose of the present invention to provide a PSI method and system in which the phase shifted images are grabbed simultaneously and therefore do not require a specially-quiet environment nor ideal optical phase components.

It is another purpose of the present invention to provide a PSI method and system in which the phase shifted images are grabbed simultaneously at several wavelengths thereby allowing imaging samples with topographical variations larger than $\lambda/2$.

It is another purpose of the present invention to provide a PSI method and system in which the optical setups, as well as the algorithms, are completely different from those disclosed in previously proposed methods and systems.

It is another purpose of the present invention to provide a PSI method and system that overcomes the problems that have previously arisen using standard PSI system and method.

Further purposes and advantages of this invention will appear as the description proceeds.

SUMMARY OF THE INVENTION

The invention is an interference microscopy 3D imaging system comprising:
  a) an illumination unit, which provides light comprised of least two wavelengths to the system;
  b) a two beam orthogonally polarized interferometer, which is illuminated by light from the illumination unit;
  c) a detection unit comprising:
    i) a tube lens;
    ii) a first 50/50 non-polarizing beam splitter, a second 50/50 non-polarizing beam splitter and a third 50/50 non-polarizing beam splitter by which the interferometer output beam is split and manipulated in space;
    iii) three parallel detectors, and with a color filter on each pixel used to detect the interference images at three different wavelengths; and
    iv) one of the following groups of components:
      A) group 1:
        i) a compensating wave plate with zero retardation aligned with its optic axis parallel to the S and P waves emerging from the interferometer;
        ii) a precision achromatic quarter wave plate aligned with its optic axis parallel to the S and P waves emerging from the interferometer;
        iii) a precision achromatic half wave plate aligned with its optic axis parallel to the S and P waves emerging from the interferometer;
        iv) three analyzers positioned after the wave plates at 45° with respect to the S and P waves;
      B) group 2:
        i) a precision achromatic quarter wave plate aligned with its optic axes at 45° with respect to the S and P waves emerging from the interferometer;
        ii) three analyzers positioned at 0°, 45°, and 90° with respect to the S and P waves emerging from the interferometer; and
  d) a process and control unit that is connected to and controls the three detectors, the process and control unit comprising software algorithms adapted to carry out a calibration procedure from known phase shifts, which is used to determine the deviations from ideality of the optical phase components and to extract correct interferometric signals and correct object heights.

Embodiments of the system comprise two beam splitters, two wave plates, two analyzers, and two parallel detectors after the tube lens.

In embodiments of the system the three parallel detectors comprise monochrome pixels.

In embodiments of the system the illumination unit comprises at least one of the following elements: a tunable light source, a non-tunable light source, a diffuser, a collecting lens, an aperture stop, a condensing lens, a field stop, a projecting lens and a polarizer.

In embodiments of the system the light source is a three wavelength LED array or a wideband source.

In embodiments of the system the light source is a laser fiber which has three different laser wavelengths coupled into the fiber or three fiber lasers of three different wavelengths with output beams that have been united in space using some optical components such as beam splitters, polarized beam splitters or dichroic mirrors. In these embodiments the laser can be configured to allow wavelength sweeping.

In embodiments of the system the two beam orthogonally polarized interferometer has the configuration of one of the following interferometer types: Linnik, Michelson, Twyman-Green, Fizau, Nomarski, Mach-Zehnder and Mirau.

In embodiments of the system the sample is mounted on a motorized stage. The motorized stage can be connected to and controlled by a processing device and can be driven by at least one of a stepper motor, a servo and a piezoelectric transducer.

In embodiments of the system the parallel detectors and the motorized stage are connected to a processing device and are controlled by the processing device.

In embodiments of the system collimated beams are used without microscope objectives and tube lens with the three parallel detectors and the three detectors comprise either single pixels for each wavelength wherein dichroic mirrors are used to split the spectral beams and direct them to the three single pixel detectors or three colored pixels combined in one detector; thereby allowing a fast interference signal to be grabbed and processed for fast displacement or vibrations measurement.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The invention is a system and method that enable obtaining high resolution 3D images in a single shot.

The system is an ultra-high speed, real time multi wavelength phase shift interference microscopy system that uses three synchronized color CCD cameras. Each CCD is equipped with a precision achromatic phase mask which in turn allows obtaining $\pi/2$ phase shifted signals in three different wavelengths simultaneously. The combination of simultaneous phase shifts at different wavelengths allows overcoming all the above mentioned problems of the prior art. In comparison with the methods using pixelated phase mask CCD [15-16] or the frequency domain (FD) real time techniques [3-4] that are sometimes combined with color CCD [17-18], the method described herein is less limited to high spatial variations of the sample; FD techniques require that the carrier frequency induced by the tilting of the reference mirror is higher than the sample spatial bandwidth—a requirement that can not always be met.

By using three (alternatively two) parallel detectors, each equipped with an achromatic phase shifter, three phase shifted (alternatively two) interference images are grabbed simultaneously and in parallel at three different wavelengths (the entire field of view is recorded at once). By using a simple three wavelengths phase shift algorithm the 3D images are obtained in real time.

The invention will now be described in two parts. Firstly the system will be described with respect to the figures and then the method of obtaining the results will be described.

Detailed Description of the Drawings

Figure 1:
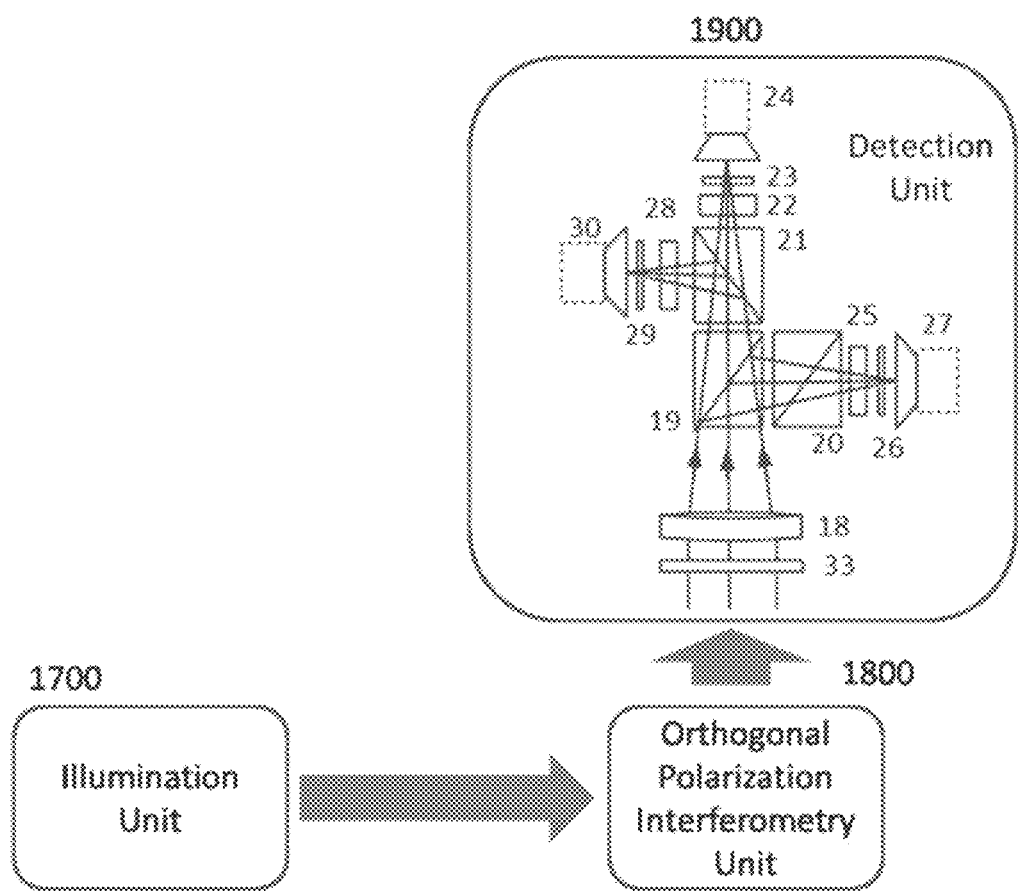
FIG. 1 is a schematic diagram of an embodiment of the general system of the invention composed of three main parts: an illumination unit, a double beam interferometer unit that uses two orthogonally polarized beams and a detection unit which uses parallel phase shifting in three different wavelengths by utilizing two or three color cameras and passive phase shifting optics. The pixels can be with color filters of any kind.

FIG. 1:

In FIG. 1 the general structure of a 3D optical microscope is depicted. The microscope comprises an illumination unit 1700 with Koehler illumination arrangement optics in some embodiments, an orthogonal polarization interferometry unit 1800 which may be of any known-in-the-literature form such as Linnik, Michelson, Twyman-Green, Fizau, Nomarski, Mach-Zehnder and Mirau type interferometers, and a detection unit 1900. The output of the interferometry unit is composed of two combined beams with orthogonal polarization; one beam is reflected from a reference target and the second beam is reflected from the sample. The combined beam emerging from the interferometry unit enters the detection unit 1900 which includes imaging, splitting, polarizing, compensating and phase retardation components. The sample and reference beams have orthogonal polarization waves, i.e., S and P waves. The two waves are incident on a wave plate 33 aligned with its optic axis at 45° with respect to the S and P waves; the wave plate is an achromatic precision quarter wave plate (QWP); alternatively the wave plate 38 produce zero phase delay or may be completely removed. The waves are then collected by the microscope tube lens 18. The tube lens has a large enough focal length so that the optical components within the imaging path do not have significant wavefront distortion effects. Elements 19, 20 and 21 are ordinary non-polarizing beam splitters with 50/50 splitting ratio for reflection and transmission. Elements 23, 26 and 29 are analyzers aligned at 45° to the S and P polarization plains; alternatively the analyzers can be rotated with alignments 0°, 90° and 45°, respectively. The analyzers are used to project both polarization waves one on top the other and thereby allowing interference. Element 22 is a wave plate (W) with zero retardation, element 28 is a precision achromatic quarter wave plate (PQWP) and element 25 is a precision achromatic half wave plate (PHWP); alternatively wave plates 22, 25 and 28 produce zero phase delay or may be completely removed. The PQWP (element 28) optionally creates $\pi/2$ phase delay (retardation) between the two polarization waves from the reference and sample arms, while the PHWP (element 25) optionally causes a n phase delay (retardation) between the reference and sample arms. Therefore, by using three parallel detectors 24, 27 and 30 with color pixels, three interference images with optionally $\pi/2$ phase delay are recorded at once. In an embodiment the parallel detector of the cameras is a charge coupled device (CCD); alternatively it is a complementary metal oxide semiconductor (CMOS) or an array of photodiodes. When the system is operated, elements 24, 27 and 30 are optionally triggered by a common TTL source or even by means of software trigger which is typically provided by a personal computer (PC).

Figure 2:
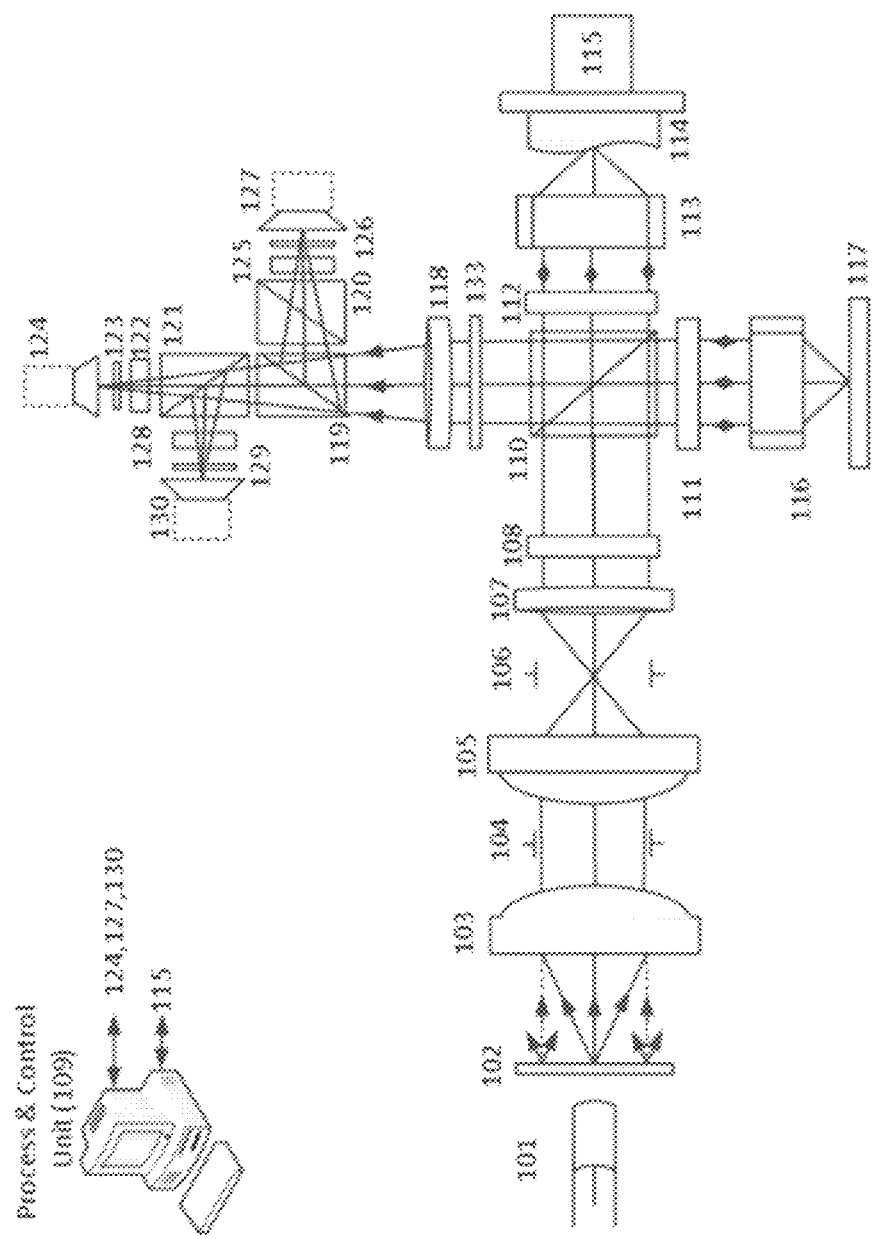
FIG. 2 is a schematic representation of one embodiment of the configuration of the microscopy system within the framework of a Linnik interference microscope.

FIG. 2:

In FIG. 2 a Linnik like optical microscopy system is depicted. In one embodiment a halogen lamp is used as the light source 101; alternatively the light source is a high power three LED source, a xenon arc lamp, or a three laser coupled source. The light emerging from the source is incident on a diffuser 102 followed by a collector (lens) 103, an aperture stop (AS) 104 and a condenser (lens) 105. A field stop (FS) 106 is positioned at the focal plane of a projecting lens 107. The FS is projected onto the back focal plane of the microscope objective lenses whereas the illumination coil (alternatively the LED/LD aperture or even the diffuser surface) is imaged onto the front focal plane of the objective lenses; therefore the microscope has the Kohler illumination arrangement. Element 108 is a polarizer rotated in one embodiment at 45° with respect to the polarization beam splitter cube 110 of the Linnik microscope. The transmitted beam propagates into the Linnik interferometer which is constructed by a polarization beam splitter (PBS) 110, two achromatic quarter wave plates (QWP) 111 and 112, two objective lenses 113 and 116, a reference mirror 117, a sample 114 and a motorized stage 115. The motorized stage may uses, for example, a stepper motor, a servo or a piezoelectric transducer. The numerical aperture (NA) of the objective lenses may have any value. The QWPs are aligned with the fast axis at 45° with respect to the plane of polarization. After reflection from the sample and reference mirror, the two beams are recombined at the PBS 110. The sample and reference beams have orthogonal polarization waves. In one embodiment the two waves are incident on a wave plate 183 aligned with its optic axis at 45° with respect to the S and P waves; the wave plate is an achromatic precision QWP. The waves are then collected by the microscope tube lens 118. The tube lens has a large enough focal length so that the optical components within the imaging path do not have significant wavefront distortion effects. Elements 119, 120 and 121 are ordinary non-polarizing beam splitters with 50/50 splitting ratio for reflection and transmission. Element 123, 126 and 129 are analyzers aligned 45° to the S and P polarization planes; alternatively the analyzers can be rotated with 0°, 90° and 45°, respectively. The analyzers are used to project both polarization waves one on top the other and thereby allowing interference. Element 122 is a wave plate (W) with zero retardation, element 128 is a precision achromatic quarter wave plate (PQWP) and element 125 is a precision achromatic half wave plate (PHWP); alternatively wave plates 122, 125 and 128 produce zero phase delay or maybe removed. The PQWP 128 creates $\pi/2$ phase delay (retardation) between the two polarization waves from the reference and sample arms, while the PHWP 125 causes a n phase delay (retardation) between the reference and sample arms. Therefore, by using three parallel detectors 124, 127 and 130, three interference images with $\pi/2$ phase delay are recorded at once at three different wavelengths. In an embodiment the parallel detector of the cameras is a charge coupled device (CCD); alternatively it is a complementary metal oxide semiconductor (CMOS), a scientific CMOS (sCMOS) or an array of photodiodes. Elements 115, 124, 127 and 130 are all controlled by a process and control unit 109 which is typically provided by a personal computer (PC).

The system in FIG. 2 can be operated as follows. The sample 114 is brought into focus and the computer triggers the CCD/CMOS to capture an image. Three phase shifted images are thus obtained in three different wavelengths. The 3D images are reconstructed using a three wavelengths phase step algorithm as will be described herein below.

Figure 3:
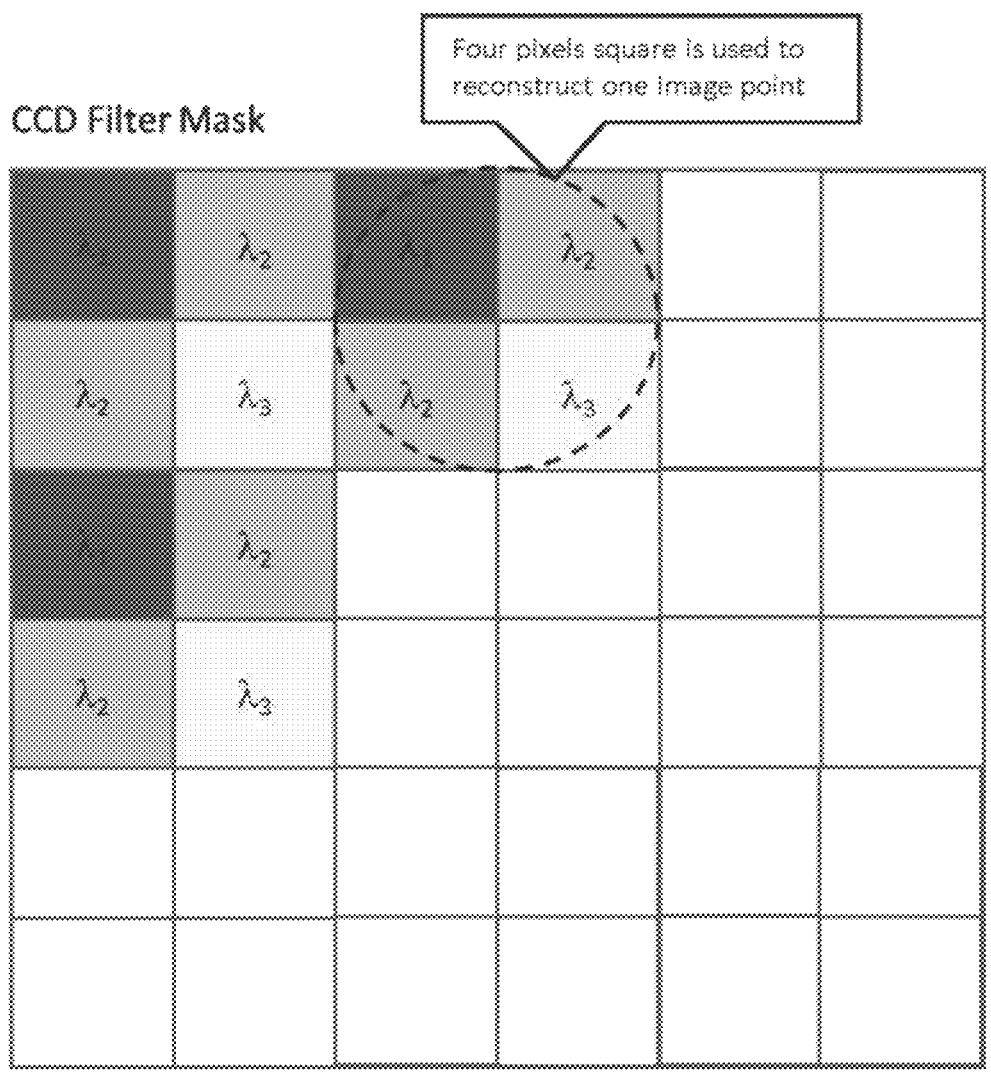
FIG. 3 is a schematic representation of one embodiment of the color filter array of the parallel detectors.

FIG. 3:

FIG. 3 shows an example of the pixel mask of the parallel detectors 124, 127 and 130. In FIG. 3 the filter mask can be a standard color mask as in ordinary color cameras or customized with $\lambda_1$, $\lambda_2$ and $\lambda_3$ being any desirable wavelength. In one embodiment the wavelength mask used has Gaussian shape such that $\lambda_1=670$ nm is the peak wavelength with full width half maximum (FWHM) of 15 nm. $\lambda_2=735$ nm with FWHM of 10 nm and $\lambda_3=750$ nm with FWHM of 10 nm.

Figure 4:
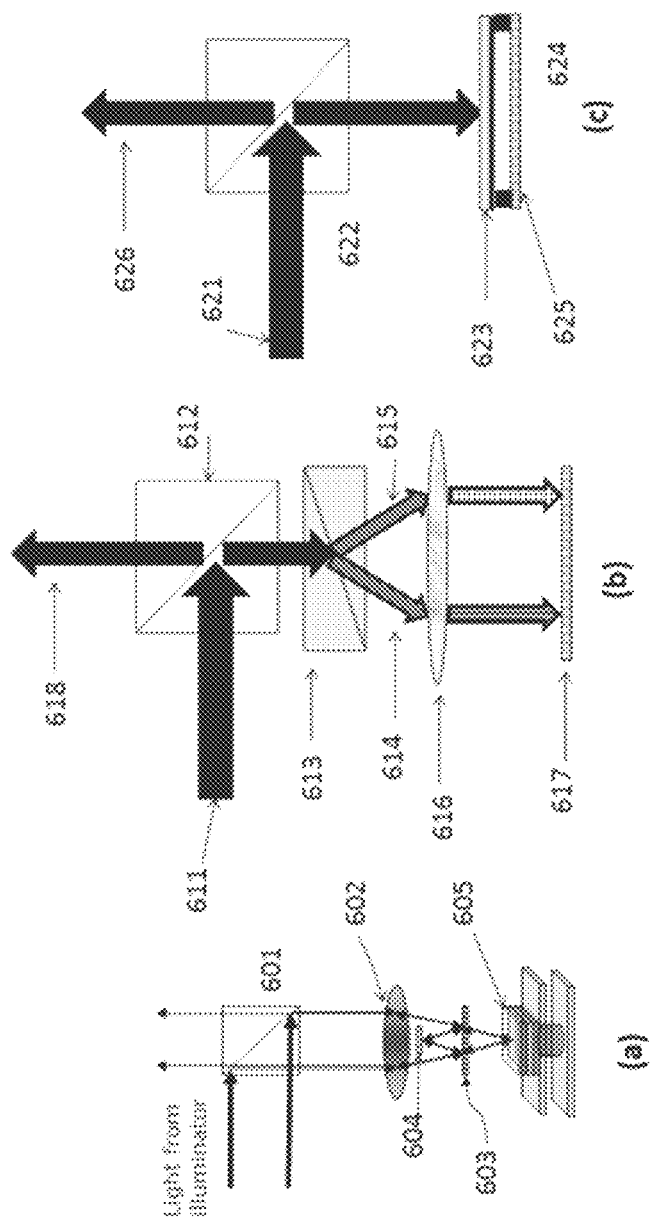
FIG. 4 shows a scheme for alternative embodiments of interferometers that use orthogonally polarized beams: (a) modified Mirau type objective with a flat polarized beam splitter replacing the beam splitter of the non-polarized Mirau objective; (b) Nomarski type interferometer; (c) Orthogonally polarized Fizau interferometer.

FIG. 4:

In FIG. 4 other alternatives for orthogonally polarized interferometer units are depicted that can replace unit 1800 of FIG. 1 or the Linnik interferometer in FIG. 2. FIG. 4a shows a modified Mirau type objective with the internal flat beam splitter (FBS) replaced with a flat polarized beam splitter (FPBS) such as a wire grid polarizer or a stack of QWP/FBS/QWP. In the latter case the beam is linearly polarized and oriented at 45 degrees to the QWP optic axis. The light coming from the illuminator is linearly polarized directed with an ordinary non-polarizing beam splitter 601 towards the modified Mirau objective lens system 602, hits the FPBS 603, splits into a TE polarized beam towards the reference mirror 604 and into a TM polarized beam towards the sample 605. The two beams then recombine upon reflection and continue to the rest of the system and towards the cameras.

FIG. 4b shows a Nomarski or differential interference contrast (DIC) interferometer unit in which the which the incident beam 611 is directed towards a Wollaston prism 613 produces two orthogonally polarized beams 614 and 615, which get collimated by microscope objective 616, hit the sample 617 at different locations, get reflected and recombined back with beam splitter 612 upon traversing the Wollaston prism 613 and continue 618 towards the imaging and phase retardation units 1900 of FIG. 1.

FIG. 4c shows a polarized Fizeau interferometer in which the incident beam 621 is directed towards an optical flat 623. The top surface of optical flat 623 is anti-reflection coated while the bottom surface acts as a polarization beam splitter such as a wire grid polarizer or a stack of QWP/FBS/QWP. In the latter case the beam is linearly polarized and oriented at 45 degrees to the QWP optic axis. The bottom surface of the optical flat 623 has small spacers 624 in order to maintain a constant gap with the sample 625 surface. Alternatively these small spacers may be removed and proximity sensors can replace them. One linearly polarized beam gets reflected from the bottom surface of optical flat 623 while an orthogonally polarized beam is transmitted to sample 625 and gets reflected. The two beams are recombined with beam splitter 622 and transmitted 626 towards the imaging and phase retardation unit 1900 of FIG. 1.

Other interferometer units that can be used in embodiments of the system include, but are not limited to, Michelson-Taylor type and Mach-Zehnder type orthogonal polarization interferometers.

Figure 5:
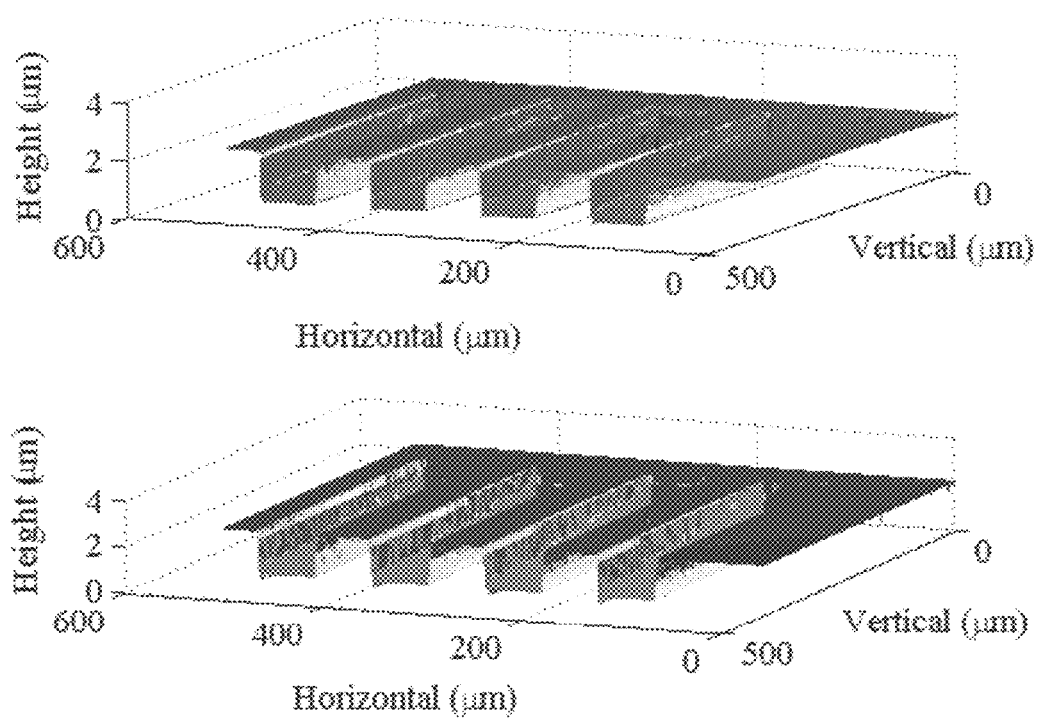
FIG. 5 shows experimental results obtained using the configuration of the microscopy system shown in FIG. 2 using two LEDs as the source.

FIG. 5 shows an experimental result using the system of FIG. 2 with monochrome CCD cameras and a two wavelength light source. The object is a calibrated VLSI grating target with 1.797 um height step and +/−0.011 um tolerance. It is seen that using two wavelengths a structure with step height much larger than the wavelength is imaged correctly. The top image of FIG. 5 shows the two wavelength 3D image while the bottom image of FIG. 5 shows the 3D image after unwrapping the phase using a single wavelength in accordance with the description of the invention.

Detailed Description of the Method of Obtaining the Results

In PSI, a two beam interferometer of some type (Linnik, Michelson, Mirau, Twyman-Green, Nomarski, Fizau, Mach-Zehnder) is normally used to produce the interference pattern of a specimen positioned in one of the interferometer arms. The reflected interference signal from each point of the sample is then formulated according to equation 1 [2]:

$$I = B + A \cos \varphi, \quad (1)$$

where B is the so-called DC level, A is the modulation (envelope) and $\varphi$ is the phase of the interference signal; this model holds also for sources with low temporal coherence [13]. The interference phase is related to the optical path difference (OPD) between a given point on the sample and the respective point on the reference mirror as formulated in equation 2, where $\lambda$ is the central wavelength of the illuminating light source. In PSI, after the phase value of each point of the sample is extracted, the local OPD is calculated and then the 3D shape of the sample is constructed; in reflection mode, the difference in OPD between two neighbor sample points equals twice their difference in height ($\Delta OPD/2 = \Delta height$).

$$\varphi = \frac{2\pi}{\lambda} \cdot OPD \quad (2)$$

When the observed surface has overall height variations larger than one fringe of the interference signal, the extracted phase values are wrapped and a phase unwrap algorithm should be applied in order to unwrap the $2\pi$ modulo of the phase and reconstruct the 3D shape of the object. Phase unwrap algorithms are likely to collapse in cases where the samples have steep height variations, excess speckle noise and or discontinuities.

An alternative way of using a phase unwrap algorithm is to use two (or more) wavelengths for imaging. For each wavelength the phase is extracted by grabbing three $\pi/2$ phase shifts, which ideally are described as follows (in equation 3, with i=1, 2, 3):

$$I_i = B + A \cos[\varphi + (i-1)\pi/2], \quad (3)$$

then, $$\varphi = tg^{-1}[(I_1 + I_3 - 2I_2)/(I_1 - I_3)] \quad (4)$$

Practically, the non-ideal optical components and system alignment may cause the three $\pi/2$ phase shifted signals to have different DC levels (B) and modulations (A) along with phase shifts with some bias relative to the desired $\pi/2$ values between the signals as described in equation 5:

$$I_i = B_i + A_i \cos[\varphi + (i+1)\pi/2 + \delta_i], \quad (5)$$

In this case, based on a one time preliminary data acquisition to characterize the nature of the non-ideality of the optical components in the system, a system fitting calibration of equation 4 has to be made in order to achieve exact phase extraction from the signals. Using a predetermined movement profile of the motorized stage mounted with a sample, such as, but not necessarily a linear movement, the three phase shifted signals for each image pixel are collected for each wavelength and the DC level, modulation and bias phase shifts are determined via fitting algorithms. Then, a modified version of equation 4 is used to extract the phase for each wavelength as follows:

$$\varphi = tg^{-1}[(c_3\tilde{I}_1 + c_1\tilde{I}_3 - (c_3+c_1)\tilde{I}_2)/((1+c_4)\tilde{I}_1 - (c_2-1)\tilde{I}_3 - (c_2+c_4)\tilde{I}_2)] \quad (6)$$

where in equation 6, $\tilde{I}_i = (A/A_i) \cdot (I_i - B_i) + B$, $B = \max\{B_1, B_2, B_3\}$, $A = \max\{A_1, A_2, A_3\}$, $c_1 = \cos(\delta_1 - \delta_2)$, $c_2 = \sin(\delta_1 - \delta_2)$, $c_3 = \cos(\delta_1 - \delta_2)$ and $c_4 = \sin(\delta_4 - \delta_2)$.

After the phase is obtained for each wavelength, one can calculate the OPD for much larger effective fringe size. For example, when using two wavelengths $\lambda_1$ and $\lambda_2$, after calculating their respective phases $\varphi_1$ and $\varphi_2$, the OPD is calculated as follows:

$$\varphi_2 - \varphi_1 = \frac{2\pi}{\lambda_2} OPD - \frac{2\pi}{\lambda_1} OPD = \frac{2\pi}{\lambda_2 \lambda_1 / (\lambda_1 - \lambda_2)} OPD \quad (7)$$

From equation 7 it is easy to note that the OPD can be easily calculated as long as the difference between $\varphi_1$ and $\varphi_2$ is smaller than $2\pi$. Therefore, much larger steps (height variations) can be imaged and no phase unwrapping algorithm is required. Effectively, the maximum step height is limited to the effective wavelength which is given according to eq.8 (in reflection mode):

$$h_{max} = 0.5\lambda_2\lambda_1/(\lambda_1 - \lambda_2) \quad (8)$$

When high numerical objective lenses are used, a correction factor which takes into account the effect of the numerical aperture should be applied to equation 8:

$$h_{max} = 0.5\lambda_2\lambda_1/[(1 - NA^2/4)(\lambda_1 - \lambda_2)] \quad (9)$$

The standard approach to extract the phase from the interference signal is by changing the reference arm length in four equal steps with step size equivalent to $\pi/2$ phase shift [2]; for each step the interference signal is recorded. Using these phase shifted signals the phase is extracted for each point of the sample. This process is repeated for each wavelength. Then, by using equation 7 the OPD of each point of the sample is calculated and the 3D image is reconstructed ($\Delta OPD/2 = \Delta height$). The fact that the phase shifting is done successively and not simultaneously is very problematic for imaging dynamically moving scenes. Moreover, the switching between wavelengths also requires time which further reduces the imaging speed and requires larger level of stability from the system.

By using a three synchronized color phase shifted parallel detector unit 1900 (see FIG. 1), the phase for three different wavelengths is obtained simultaneously. The parallel detectors can be ordinary color parallel detectors (RGB) or can be customized with preferable wavelength filters deposited on each pixel in accordance with FIG. 3. The fact that a three wavelengths approach is used allows obtaining large steps imaging with high accuracy. First, the OPD is calculated with low accuracy using the values from pixels with closer wavelength values in a four pixels square, say $\lambda_2$ and $\lambda_3$.

$$OPD = \frac{\varphi_3 - \varphi_2}{2\pi} \lambda_3 \lambda_2 / (\lambda_2 - \lambda_3) = \frac{\Delta\varphi_{32}}{2\pi} \lambda_{eff,32} \quad (10)$$

Since close wavelength values are used, a large effective wavelength is produced which in turn imposes a relatively large error on the value of the calculated OPD (for some wavelength combinations it might be as large as $\sim\lambda$). Therefore, additional calculation of the OPD is made using the other two pixels, with less proximity wavelengths values in a four pixels square, say $\lambda_1$ and $\lambda_2$ $$OPD = \left(\frac{\varphi_2 - \varphi_1}{2\pi} + 2m\right)\lambda_2\lambda_1 / (\lambda_1 - \lambda_2) = \left(\frac{\Delta\varphi_{21}}{2\pi} + 2m\right)\lambda_{eff,21} \quad (11)$$

Since less close wavelength values are used, a smaller effective wavelength is produced which in turns imposes a relatively smaller error on the value of the calculated OPD (for some wavelength combinations it might be as large as $\sim 0.1\lambda$). In equation 11, m is an integer that was introduced in order to account for the wrapping of the phase when the smaller effective wavelength is used ($\lambda_{eff,21}$). The order of m is determined using equations 10 and 11:

$$m = int\lfloor(\Delta\varphi_{32}\lambda_{eff,32}/\lambda_{eff,21} - \Delta\varphi_{21})/4\pi\rfloor \quad (12)$$

After the order of m is determined, the OPD is recalculated:

$$OPD = \left\{\frac{\Delta\varphi_{21}}{2\pi} + 2int[(\Delta\varphi_{32}\lambda_{eff,32}/\lambda_{eff,21} - \Delta\varphi_{21})/4\pi]\right\}\lambda_{eff,21} \quad (13)$$

Since the error in the OPD is still quite large by using eq.13 ($\sim 0.1\lambda$), additional calculation of the OPD is made using the average value of two pixels with identical wavelength values ($\lambda_2$) in a four pixels square:

$$OPD = \left(\frac{\varphi_2}{2\pi} + 2n\right)\lambda_2 \quad (14)$$

In equation 14, n is an integer that was introduced in order to account for the wrapping of the phase when the primary wavelength is used ($\lambda_2$). The order of n is determined using equations 13 and 14:

$$n = int\left(\frac{\lambda_{12}}{\lambda_2}\left\{int\left[\left(\frac{\lambda_{23}}{\lambda_{21}}\varphi_{32} - \varphi_{21}\right)/4\pi\right] + \varphi_{21}/4\pi\right\} - \varphi_2/4\pi\right) \quad (15)$$

After the order of n is determined, the OPD is recalculated with accuracy in the range of $0.005\lambda_2$ using equation 14 and 15:

$$OPD = \lambda_2\left(\frac{\varphi_2}{2\pi} + 2int\left(\frac{\lambda_{12}}{\lambda_2}\left\{int\left[\left(\frac{\lambda_{23}}{\lambda_{12}}\varphi_{32} - \varphi_{21}\right)/4\pi\right] + \varphi_{21}/4\pi\right\} - \varphi_2/4\pi\right)\right) \quad (16)$$

Using eq.16 and the fact that $\Delta OPD/2 = \Delta height$ between two adjacent points on the sample (for reflection mode), the 3D image of the sample can be calculated in real time with nanometer accuracy even for large step samples.

Another embodiment of the invention uses a polarized Mirau common path interferometer. This interferometer is similar to the Mirau objective but with slight modification to allow integration into the system of the invention. FIG. 4a shows this common path interferometry unit that replaces the non-common path Linnik interferometer depicted in FIG. 2. It is a modified Mirau type objective with the internal flat beam splitter (FBS) replaced with a flat polarized beam splitter such as a wire grid polarizer or a stack of QWP/FBS/QWP. This type of objective already exists in the prior art (see US2010/0309476 A1 and U.S. Pat. No. 8,072,610 B1) but in the present invention it is integrated with a parallel phase retardation imaging system in which the incident beam polarization is linearly polarized at 45 degrees to the axis of the flat polarized beam splitter. The light coming from the illuminator is directed with the ordinary non-polarizing beam splitter 601 towards the modified Mirau objective lens system 602, hits the flat PBS (e.g. wire grid polarizer) 603, splits into TE polarized beam towards the reference mirror 604 and into TM polarized beam towards the sample 605. The two beams then recombine in reflection and continue to the rest of the system to unit 1900 of FIG. 1.

Another preferred embodiment is depicted in FIG. 4b in which a Nomarski or differential interference contrast interferometer unit is shown. The Wollaston prism 613 produces the two orthogonally polarized beams, which are collimated by microscope objective 616, hit the sample 617 at different locations, are reflected and recombined back upon traversing the Wollaston prism 613 in the opposite direction and continue towards the imaging and phase retardation unit 1900 of FIG. 1 . . . .

Another embodiment is shown in FIG. 4c, which consists of a polarized Fizeau interferometer in which the incident beam 621 is directed towards an optical flat 623. The top surface of optical flat 623 is anti-reflection coated while the bottom surface acts as a polarization beam splitter such as a wire grid polarizer or a stack of QWP/FBS/QWP. In the latter case the beam linearly polarized and oriented at 45 degrees to the QWP optic axis. The bottom surface of the optical flat 623 optionally has small spacers 624 in order to maintain a constant gap with the sample surface. Alternatively these small spacers maybe removed and optionally some proximity sensors can replace them. One linearly polarized beam gets reflected from the bottom surface of optical flat 623 while an orthogonally polarized beam is transmitted to sample 625 and gets reflected. The two beams are recombined with beam splitter 622 and transmitted towards the imaging and phase retardation unit 1900 of FIG. 1.

Producing the Phase Shift

The phase shifts between the three cameras are produced in the present invention by using two slightly different approaches to arranging the wave plates.

First Approach:

In the first approach element 33, 133 in FIGS. 1 and 2, respectively, is used as a zero retardation wave plate, that is, the element has no effect on the interference signal emerging from the Linnik interferometer and thus can be even completely excluded from the setup. In this case, the analyzers in front of the cameras are aligned at 45° with respect to the S and P polarization directions while the optic axes of the retardation wave plates are parallel to the S and P polarization directions of the waves emerging from the interferometer. As a result, an achromatic phase shift is produced between the three cameras; a zero phase shift is generated at the camera, which is equipped with the zero retardation wave plate, a $\pi/2$ phase shift is introduced in the interference signal generated in the camera which is equipped with the precision achromatic quarter wave plate (PQWP) and a $\pi$ phase shift is introduced in the interference signal generated in the camera which is equipped with the precision achromatic half wave plate (PHWP).

Second Approach

In the second approach the wave plates 22, 28 and 25 in the detection unit 1900 of FIG. 1 and their respective designations in FIG. 2 are completely excluded from the setup while element 33, 133 in FIGS. 1 and 2, respectively, is used as a PQWP retardation wave plate, which is rotated at 45° with respect to the S and P polarization waves emerging from the interferometer. As a result, the incident S and P linear polarization waves are converted into circular polarization waves with left and right handedness LH and RH, respectively. The two circular polarization waves are collected by the tube lens, then split by the beam splitters, then linearly polarized by the analyzers and finally projected onto the camera image plane. The analyzers are aligned at 0°, 45° and 90° with respect to the original directions of the S and P linear polarization. As a result, a phase shift of 0 retardation is introduced in the interference signal generated in the camera equipped with the analyzer that is rotated by 0°, whereas a $\pi/2$ retardation is generated at the interference signal recorded by the camera equipped with the analyzer that is rotated in 45° and a $\pi$ retardation is generated at the interference signal recorded by the camera equipped with the analyzer that is rotated in 90°. The first work to have suggested phase shifting by using a rotated polarizer is [22].

To further clarify this issue the Jones matrices formalism is now used to show how the phase shift is generated. Consider the Jones vectors of RH and LH circularly polarized waves which represent the circular waves exiting the PQWP positioned in front of the tube lens (element 33, 133 in FIGS. 1-2):

$$E_{RH} = \frac{1}{\sqrt{2}}\begin{pmatrix} 1 \\ -i \end{pmatrix}\exp(i\phi_1) \quad (17)$$

$$E_{LH} = \frac{1}{\sqrt{2}}\begin{pmatrix} 1 \\ i \end{pmatrix}\exp(i\phi_2) \quad (18)$$

In equations 17-18, $\varphi_1$ and $\varphi_2$ are the phases of the optical waves coming from the reference and sample arms of the interferometer. After the circular waves split at the beam splitters, they are incident on a linear polarizer which is rotated at an angle $\alpha$ where $\alpha$ can be 0, 45 or 90 degrees. The Jones matrix is now written for an analyzer rotated at a degrees with respect to the P polarization direction:

$$P(\alpha) = \begin{pmatrix} \cos^2\alpha & \cos\alpha\sin\alpha \\ \cos\alpha\sin\alpha & \sin^2\alpha \end{pmatrix} \quad (19)$$

The RH circular polarization wave transmitted through the analyzer is then expressed using the Jones calculus formalism, giving:

$$E_{RH,out} = P(\alpha)E_{RH} = \begin{pmatrix} \cos^2\alpha & \cos\alpha\sin\alpha \\ \cos\alpha\sin\alpha & \sin^2\alpha \end{pmatrix}\frac{1}{\sqrt{2}}\begin{pmatrix} 1 \\ -i \end{pmatrix}\exp(i\phi_1) \quad (20)$$

$$E_{RH,out} = \frac{1}{\sqrt{2}}\begin{pmatrix} \cos\alpha \\ \sin\alpha \end{pmatrix}\exp[i(\phi_1 - \alpha)]$$

Similarly, the LH circular polarization wave is:

$$E_{LH,out} = \frac{(1)}{(\sqrt{2})}\begin{pmatrix} \cos\alpha \\ \sin\alpha \end{pmatrix}\exp[i(\phi_2 + \alpha)] \quad (21)$$

Clearly, the phase delay introduced between the reference and sample waves is directly related to the rotation angle of the analyzer:

$$\Delta\varphi = \angle E_{LH,out} - \angle E_{RH,out} = \varphi_2 - \varphi_1 + 2\alpha = \Delta\varphi + \beta \quad (22)$$

The constant phase delay $\Delta\varphi$ appears common to all the interference signals, which are produced at the different cameras, while the $\beta$ phase delay is different in each camera. For the camera equipped with the analyzer that is rotated at $\alpha=00$, the phase delay is $\beta=0$. For the camera equipped with the analyzer that is rotated at $\alpha=45°$, the phase delay is $\beta=2\alpha=90°=\pi/2$ rad. For the camera equipped with the analyzer that is rotated at $\alpha=90°$, the phase delay is $\beta=2\alpha=180°=\pi$ rad.

Although embodiments of the invention have been described by way of illustration, it will be understood that the invention may be carried out with many variations, modifications, and adaptations, without exceeding the scope of the claims.

BIBLIOGRAPHY

1. J. H. Bruning, "Fringe Scanning Interferometers," in Optical Shop Testing, D. Malacara, Ed., 409-437, (Wiley, New York, 1978).
2. K. Creath, "Phase-measurement interferometry techniques," in [Progress in Optics], Wolf, E., ed., Elsevier Science Publishers, Amsterdam, 351-366, (1988).
3. M. Takeda, H. Ina, S. Kobayashi, "Fourier-transform method of fringe-pattern analysis for computer based topography and interferometry", J. Opt. Soc. Am., 72, 156-160 (1982).
4. W. W. Macy, "Two-dimensional fringe-pattern analysis", Appl. Opt., 22, 3898-3901, (1983).
5. H. A. Vrooman, A. A. M. Maas, "Image processing algorithm for the analysis of phase-shifted speckle interference patterns", Appl. Opt., 30, 1636-1641 (1991).
6. K. A. Stetson, "Phase-step interferometry of irregular shapes by using an edge-following algorithm", Appl. Opt., 31, 5320-5325 (1992).

7. Y. Xu, C. Ai, "Simple and effective phase unwrapping technique", SPIE Vol. 2003, 254-263 (1993).
8. J. A. Quiroga, E. Bernabeu, "Phase-unwrapping algorithm for noisy phase-map processing", Appl. Opt., 33, 6725-6731 (1994).
9. J. M. Hurntely, H. Saldner, "Temporal phase-unwrapping algorithm for automated interferogram analysis", Appl. Opt., 32, 3047-3052 (1993).
10. J. C. Wyant, "Testing Aspherics Using Two-Wavelength Holography", Appl. Opt., 10, 2113-2118 (1971).
11. C. Polhemus, "Two-Wavelength Interferometry", Appl. Opt., 12, 2071-2074 (1973).
12. Y. Y. Cheng, J. C. Wyant, "Two-wavelength phase shifting interferometry", Appl. Opt., 23, 4539-4543 (1984).
13. K. Creath, "Step height measurement using two-wavelength phase-shifting interferometry", Appl. Opt. 26, 2810-2816 (1987).
14. Y. Y. Cheng, J. C. Wyant, "Multiple-wavelength phase-shifting interferometry", Appl. Opt., 24, 804-807 (1985).
15. M. Novak, J. Millerd, N. Brock, M. N. Morris, J. Hayes, J. Wyant, "Analysis of a micropolarizer array-based simultaneous phase-shifting interferometer", Appl. Opt., 44, 6861-6868 (2005).
16. K. Creath, G. Goldstein, "Dynamic quantitative phase imaging for biological objects using a pixelated phase mask", Bio. Med. Opt. Expr., 3, 2866-2880 (2012).
17. Etienne Cuche, Yves Emery and Frederic Montfort, "One Shot Analysis", Nature Photonics 3, 633-635 (2009).
18. M. T. Rinehart, N. T. Shaked, N. J. Jenness, R. L. Clark, A. Wax, "Simultaneous two-wavelength transmission quantitative phase microscopy with a color camer", 35, 2612-2614 (2010).
19. R. Smythe, R. Moore, "Instantaneous phase measuring interferometry", Opt. Eng., 23, 361-364 (1984).
20. C. L. Koliopoulos, "Simultaneous phase shift interferometer", SPIE Vol., 1531, 119-127 (1991).
21. B. K. A. Ngoi, K. Venkatakrishnan, N. R. Sivakumar, T. Bo, "Instantaneous phase shifting arrangement for micro-surface profiling of flat surfaces", Opt. Comm., 190, 109-116 (2001).
22. S. Suja Helen, M. P. Kothiyal, R. S. Sirohi, Achromatic phase shifting by a rotating polarizer, Optics Communications 154, 1998, 249-254

ADDITIONAL REFERENCES a. US2010/0309476 A1
b. U.S. Pat. No. 8,072,610 B1
c. U.S. application Ser. No. 15/118,877
d. d. Avner Safrani and Ibrahim Abdulhalim, "High-speed 3D imaging using two-wavelength parallel-phase-shift interferometry", Optics Letters, Vol. 40, No. 20, 4651-4654 (Oct. 15, 2015)

The invention claimed is:

1. An interference microscopy 3D imaging system comprising:
   a) an illumination unit, which provides light comprised of least two wavelengths to the system;
   b) a two beam orthogonally polarized interferometer, which is illuminated by light from the illumination unit;
   c) a detection unit comprising:
      i) a tube lens;
      ii) a first 50/50 non-polarizing beam splitter, a second 50/50 non-polarizing beam splitter and a third 50/50 non-polarizing beam splitter by which the interferometer output beam is split and manipulated in space;
      iii) three parallel detectors, and with a color filter on each pixel used to detect the interference images at three different wavelengths; and
      iv) one of the following groups of components:
         A) group 1:
            i) a compensating wave plate with zero retardation aligned with its optic axis parallel to the S and P waves emerging from the interferometer;
            ii) a precision achromatic quarter wave plate aligned with its optic axis parallel to the S and P waves emerging from the interferometer;
            iii) a precision achromatic half wave plate aligned with its optic axis parallel to the S and P waves emerging from the interferometer;
            iv) three analyzers positioned after the wave plates at 45° with respect to the S and P waves;
         B) group 2:
            i) a precision achromatic quarter wave plate aligned with its optic axes at 45° with respect to the S and P waves emerging from the interferometer;
            ii) three analyzers positioned at 0°, 45°, and 90° with respect to the S and P waves emerging from the interferometer; and
   d) a process and control unit that is connected to and controls the three detectors, the process and control unit comprising software algorithms adapted to carry out a calibration procedure from known phase shifts, which is used to determine the deviations from ideality of the optical phase components and to extract correct interferometric signals and correct object heights.

2. The interference microscopy 3D imaging system of claim 1, wherein the system comprises two beam splitters, two wave plates, two analyzers, and two parallel detectors after the tube lens.

3. The interference microscopy 3D imaging system of claim 1, wherein the three parallel detectors comprise monochrome pixels.

4. The interference microscopy 3D imaging system of claim 1, wherein the illumination unit comprises at least one of the following elements: a tunable light source, a non-tunable light source, a diffuser, a collecting lens, an aperture stop, a condensing lens, a field stop, a projecting lens and a polarizer.

5. The interference microscopy 3D imaging system of claim 4, wherein the light source is a three wavelength LED array.

6. The interference microscopy 3D imaging system of claim 4, wherein the light source is a wideband source.

7. The interference microscopy 3D imaging system of claim 4, wherein the light source is a laser fiber which has three different laser wavelengths coupled into the fiber or three fiber lasers of three different wavelengths with output beams that have been united in space using some optical components such as beam splitters, polarized beam splitters or dichroic mirrors.

8. The interference microscopy 3D imaging system of claim 7, wherein the laser is configured to allow wavelength sweeping.

9. The interference microscopy 3D imaging system of claim 1, wherein the two beam orthogonally polarized interferometer has the configuration of one of the following interferometer types: Linnik, Michelson, Twyman-Green, Fizau, Nomarski, Mach-Zehnder and Mirau.

10. The interference microscopy 3D imaging system of claim 1, wherein the sample is mounted on a motorized stage.

11. The interference microscopy 3D imaging system of claim 10, wherein the motorized stage is connected to and controlled by a processing device and is driven by at least one of: a stepper motor, a servo and a piezoelectric transducer.

12. The interference microscopy 3D imaging system of claim 1, wherein the parallel detectors and the motorized stage are connected to a processing device and are controlled by the processing device.

13. The interferometric system of claim 1 wherein collimated beams are used without microscope objectives and tube lens with the three parallel detectors and the three detectors comprise either single pixels for each wavelength wherein dichroic mirrors are used to split the spectral beams and direct them to the three single pixel detectors or three colored pixels combined in one detector; thereby allowing a fast interference signal to be grabbed and processed for fast displacement or vibrations measurement.

* * * * *